United States Patent [19]

Smith

[11] Patent Number: 4,751,607

[45] Date of Patent: Jun. 14, 1988

[54] COMMUNICATION LINE TRANSIENT PROTECTION

[75] Inventor: Douglas C. Smith, Rumson, N.J.

[73] Assignees: American Telephone and Telegraph Company, New York, N.Y.; AT&T Information Systems Inc., Morristown, N.J.

[21] Appl. No.: 895,224

[22] Filed: Aug. 11, 1986

[51] Int. Cl.⁴ .............................................. H02H 9/08
[52] U.S. Cl. ..................................... 361/119; 361/58; 361/135; 379/416; 333/25; 333/32
[58] Field of Search ................. 361/58, 107, 108, 111, 361/113, 118, 119, 126, 127; 332/12, 25, 26, 32; 379/416, 417

[56] References Cited

U.S. PATENT DOCUMENTS

| | | | |
|---|---|---|---|
| 1,714,476 | 5/1929 | Milnor | 379/417 X |
| 1,769,969 | 7/1930 | Shaw | 379/417 X |
| 1,836,575 | 12/1931 | Cannon | 333/12 X |
| 2,159,927 | 5/1939 | Cannon | 333/12 X |
| 2,338,405 | 1/1944 | Cash et al. | 361/119 X |
| 2,362,549 | 11/1944 | Hale | 333/32 X |
| 3,223,920 | 12/1965 | Sasaki | 333/25 X |
| 3,683,271 | 8/1972 | Kobayashi | 361/113 X |
| 4,056,790 | 11/1977 | Pospischil et al. | 379/417 X |
| 4,254,442 | 3/1981 | Dijkmans | 361/56 |
| 4,259,705 | 3/1981 | Stifter | 361/118 X |

Primary Examiner—A. D. Pellinen
Assistant Examiner—H. L. Williams
Attorney, Agent, or Firm—David H. Tannenbaum; David R. Padnes

[57] ABSTRACT

The severity of the problems of transmitting high speed data over a regular twisted wire pair are legendary. These problems arise from a variety of conditions, including the capacitance of the wire (which increases with length) and the propensity of unshielded wire to pickup high induced voltages. An arrangement is disclosed that is suitable for short, as well as long, wire distances and which also effectively eliminates the interference problem caused by induced voltages, including those causes by electrostatic discharge. This arrangement passes two twisted wire pairs through a series of ferrite cores. The twisted wire pairs coming out of the ferrite cores are terminated such that one of the pairs is connected to ground while the signal carrying twisted pair is connected to a small signal balun coil, pulse shaping circuit and low pass filter.

21 Claims, 3 Drawing Sheets

COMMUNICATION LINE TRANSIENT PROTECTION

BACKGROUND OF THE INVENTION

This invention relates to a circuit for providing balanced data transmission and, more particularly, to such a circuit for balancing such transmission over existing telephone wiring and for suppressing common mode currents in these lines.

The severity of the problems of transmitting high speed data over a regular twisted wire pair wire is legendary. These problems arise from a variety of conditions, including the capacitance of the wire (which increases with length), and the propensity of unshielded wire to pickup induced (capacitively or inductively coupled) voltages. In addition, electro-static discharge (ESD) voltages, which can be on the order of several kilovolts, applied to equipment by human operators, can cause transmission errors by impressing common mode voltages that exceed the equipment's limits on the wire pairs. Since many systems rely on a balanced pair of signals, any unbalance condition with respect to voltages on a conductor can have a severe impact. Over the years, many attempts have been made to balance such transmission lines using circuits which have come to be known as balun circuits; the word apparently coming from balanced-unbalanced. Many of these balun circuits have inductance coils which pass both signal wires through the coil windings, one signal wire per each winding. These windings are phased such that differential data signals pass unimpeded while common mode interference is rejected. Because of electro-static discharges, balun coils have, for many reasons, proven to be unsatisfactory.

SUMMARY OF THE INVENTION

I have designed a circuit for use with a traditional balun transformer but which also contains a circuit for protection against ESD voltages. Ths circuit is suitable for short, as well as long, wire distances. The arrangement additionally passes two twisted wire pairs through a series of ferrite cores. The twisted wire pairs coming out of the ferrite cores are terminated such that one of the pairs is connected to ground while the signal carrying twisted wire pair, which carries both parts of the balanced signal, is connected through a small signal balun coil to a pulse-shaping circuit and low pass filter.

Using my arrangement, potential differences between the equipment at the far ends of the cable cause voltages to be induced equally in all leads. A switch is used to add inductance and resistance to help in situations having long line length and, thus, increased capacitance.

The signals are then transmitted to the receiving terminal over a special shielded cable, which is the subject of concurrently filed, copending patent application of E. N. Sepe Case 4, Ser. No. 895,203 filed Aug. 11, 1986, which application is hereby incorporated by reference herein and which application is assigned to the same assignee as is this application.

BRIEF DESCRIPTION OF THE DRAWINGS

These and othr objects and features, together with the operation and utilization of the present invention, will be more apparent from the illustrative embodiment shown in conjunction with the drawings in which.

DETAILED DESCRIPTION

Figure 3:
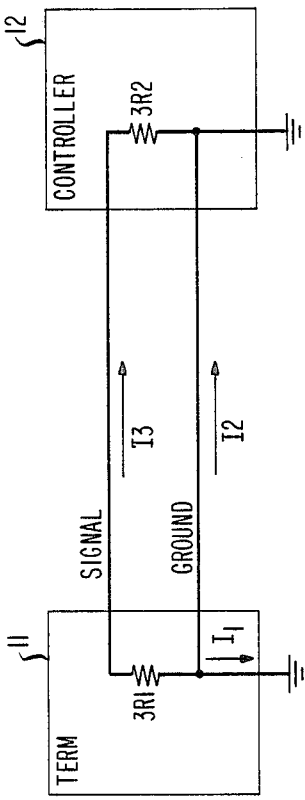
FIGS. 3 and 4 show the principles behind my concept.

Prior to discussing the actual implementation of my concept to a balun circuit, it would be helpful to understand the principles underlying the concept. This can be accomplished by reference to a simplified diagram of one of the signal paths which is shown in FIG. 3. During and after an electro-static discharge (ESD) event, the discharge current follows via three paths out of terminal 11. As would be expected, most of the discharge current flows out of the terminal via the green wire ground conductor of the power cord to building ground. This is shown as current I1. Some current (I2) flows via the ground conductor while some current (I3) flows via the signal conductor to controller 12 and to ground via the controller's ground connection. Current I3 can easily produce voltages across load resistors 3R1 and 3R2 which exceed the common mode range of the data receiver which is about 3 volts for equipment powered from popular 5-volt supplies and directly coupled to the line. Current I3 flows because there is a difference of potential between terminal 11 and controller 12 as a result of the ESD event. The total current flowing between the devices is divided between I2 and I3.

Figure 4:
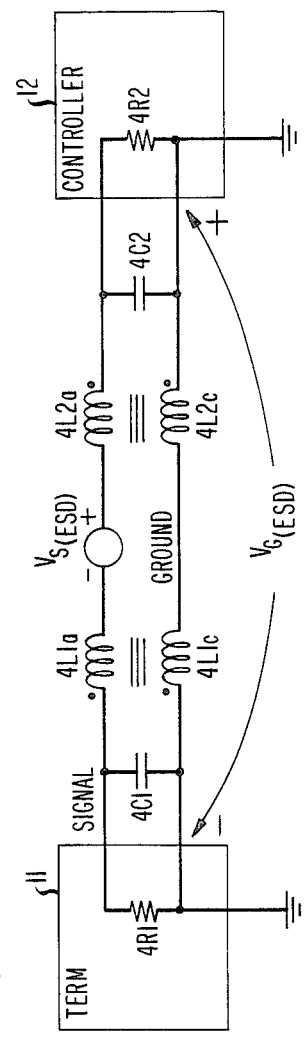

The solution, which forms the basis for my invention, is shown in a simplified diagram in FIG. 4. The addition of inductors 4L1a, 4L2a, 4L1c, 4L2c helps in two ways. First, the inductance of the windings, by adding series impedance, reduces the total current that flows between controller 12 and terminal 11 thereby reducing the voltage across load resistors 4R1 and 4R2. Second, the inductors are magnetically coupled with each other and phased so as to form a longitudinal choke. This arrangement operates in a dual way. First, without the magnetic coupling between the inductor windings, the data signals on the signal wire would be attenuated by the additional inductor impedance and, second, the inductors, because of their phasing, induce on the signal wire a voltage, VS(esd), which is of the same polarity and close to the same value as the voltage VG(esd) which appears between the terminal and controller across the ground wire. Thus, when the voltages around the loop (including load resistors 4R1 and 4R2) are summed, it can be seen that the induced voltage VS(esd) acts to cancel part of VG(esd) so that only the difference between VS and VG is divided between load resistors 4R1 and 4R2. In actuality, transmission line effects can come into play, and the situation becomes more complex. However, the basic principles of this simple analysis are easily extended to more complicated cases.

The addition of filter capacitors 4C1 and 4C2 help to roll off the frequencies which, while above the useful data range, still contain significant ESD energy.

Figure 1:
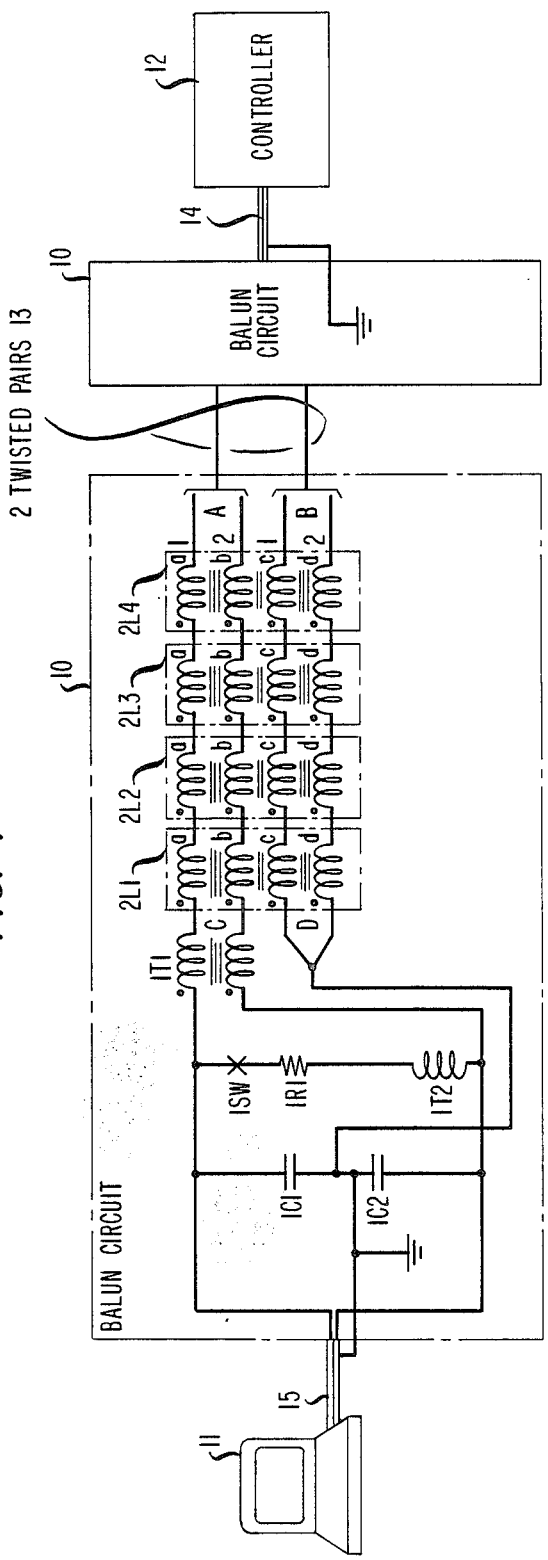
FIG. 1 shows a balun circuit using my concepts.

Turning now to FIG. 1, there is shown controller 12 which is assumed to be transmitting to, and receiving data transmissions in a balanced format from, terminal 11. Balanced, in this example, means that the signal on one wire is balanced with respect to the signal on the other wire. Thus, when the signal on one wire is high (1) the signal on the other wire is low (0). These signals, which are on leads A of twisted wire pair 13, pass through balun circuit 10 at the controller 12 end of the twisted wire pair and through balun circuit 10 at the terminal 11 end of the twisted wire pair. The distance between the balun circuits typically can be 700 feet and can be a simple twisted wire pair commonly used for voice telecommunications.

A second twisted wire pair 13B (or a single conductor) is run in conjunction with the first signalling twisted wire pair. This second pair is used to connect the chassis ground of terminal 11 to the chassis ground of controller 12.

ESD voltages are controlled by ferrite core inductors 2L1, 2L2, 2L3 and 2L4. In my embodiment, there are four such inductors. The number of such inductors is dependent upon several factors. First, interturn capacitance on a core must be kept small (about 1 pf). Thus, instead of one core with many turns, several cores with only a few turns each should be used. The number of cores used must be enough to keep the common mode voltage within acceptable limits at the data receiver due to an ESD event. Typically, this will require four to eight cores.

Data signals on the A twisted wire pair pass through the ferrite cores. By selecting the phasing of the windings, as discussed with respect to FIG. 4, the adverse effects associated with ESD are minimized. The polarity, with respect to the two signalling leads, is such that the ferrite inductors 2L1-2L4 are transparent to data transmission.

Since both signalling leads are subject to nearly the same induced voltages, the voltage differentials created with respect to the balanced signals as a result of an ESD event are small enough to be negligible. These signals, which may be at a raised level with respect to ground at either end (but substantially balanced with respect to each other) are then applied to the balun inductance 1T1 for further balancing before being applied to cable 15 for presentation to terminal 11.

Balun coil 1T1 works to suppress the longitudinal component of the data signals on the signalling leads only. The design of balun coil 1T1 is well-known in the art and is such that a high inductance for small signals is necessary. Thus, the balun coil might use many turns on a small core while, as discussed above, the ESD protecting cores (2L1-2L4) use only a few turns per core on much larger cores. The inductive permeability of the small signal balun coil typically is significantly higher than is the permeability of the ESD cores. The object in the ESD cores is to minimize interturn capacitance and prevent core saturation in the ESD cores during an ESD event.

Switch 1sw is operated, either manually or electronically, as a result of a stimulus representing a long length of twisted wire pairs between balun circuits to add resistance and inductance to the circuit so as to compensate for the increased capacitance of the longer wire length.

Figure 2:
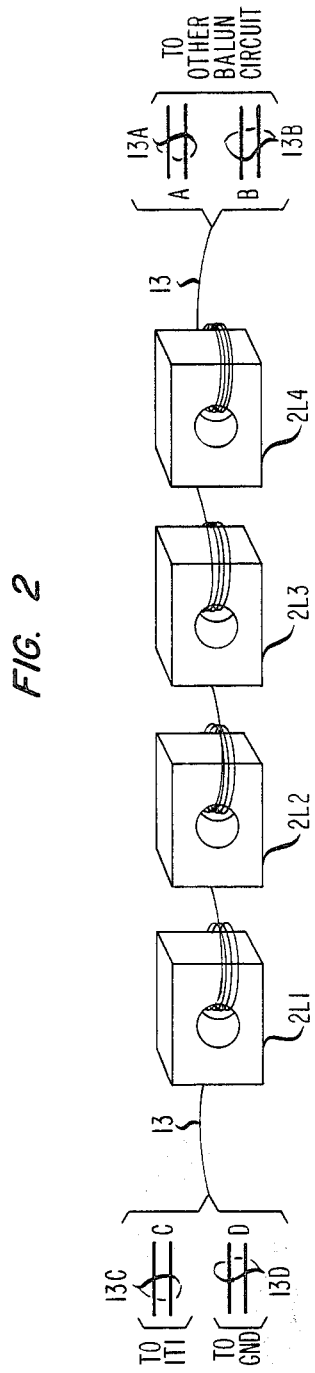
FIG. 2 is a pictorial view showing the winding on four coils.

FIG. 2 shows the actual arrangement of the ferrite cores and shows two twisted wire pairs, which could be separate wire pairs or combined into a single cable, passing through four cores, 2L1, 2L2, 2L3 and 2L4. The use of multiple cores reduces interturn capacitance and raises the resonant frequency of the structure. This is important due to the high frequency components generated by an ESD event. The cable, or cables, each are wrapped several times around each core and then passed on to the next core. In one example, I used four turns of the twisted wire pairs around a core made from type 43 ferrite material obtained from the Fair-Rite Corporation. The core used was model number 2643164151 obtainable from the same source. It should be noted that many materials having constant permeability over a wide frequency range can be used. Also, a good, but not necessarily required, attribute would be a lossy core material promoting a real component of impedance in addition to the imaginary component which is typically associated with an inductor.

CONCLUSION

Also, it should be noted that, while my circuit is shown in conjunction with data to a terminal, it can be used in any situation where electro-static discharge voltages present a problem. These problems can occur both in situations using twisted wire pairs and even in situations using coaxial cables and whether or not the communication is balanced or transmitted in any other mode.

While the balun circuit is shown in conjunction with a controller and a terminal, this has been done for ease of explanation. Any devices that communicate data can be connected to the twisted wire pairs. This connection can be between two devices, as shown, or can include many devices all connected in parallel or serially. While digital data is the focus of this embodiment, the circuit will function with any type of transmission, analog or digital.

It is also important to note that, while the discussion has focused on the problem of electro-static discharge current, any voltage or current surges or transients on a communication line can be controlled using my concepts without regard to how the surges were generated.

Also, for circuits where unbalanced signals are tolerable, my circuit can be used for surge protection by eliminating the small signal balun coil and even by eliminating the pulse shaping circuit.

What is claimed is:

1. A circuit for connection in a communication line between two communicating devices, said communication line having at least one signalling lead for carrying the communication signals between said communicating devices and having at least one ground lead for connection to said communication devices, said circuit forming a linear transient overvoltage protection circuit comprising inductance established in conjunction with said signalling lead and said ground lead, said inductance cross-coupled such that voltages of substantially the same magnitude are developed on said signal lead and said ground lead so as to maintain the integrity of carried communication signals during transient overvoltages occurring on either said signal lead or said ground lead, and said circuit comprising a plurality of serially-connected inductors wherein each inductor is wound with said signal and said ground leads and the windings of any of said inductors have one phase.

2. The invention set forth in claim 1 wherein said inductance is established by a plurality of inductance cores around each of which few turns of said leads are positioned so as to insure low intrawinding capacitance.

3. The invention set forth in claim 1 wherein said inductance is established by a plurality of said cores around each of which few turns of said signal and ground leads are positioned one core at a time so as to insure low intrawinding capacitance on each core and low capacitance between the windings of the separate cores.

4. The invention set forth in claim 1 wherein said signalling lead and said ground lead is each a plurality of leads and wherein said inductance is cross-coupled such that voltages developed with respect to one of said leads is also developed with substantially the same magnitude and with the same polarity with respect to all said other leads.

5. The invention set forth in claim 2 wherein said cores are constructed from ferrite material.

6. The invention set forth in claim 4 wherein said cores are constructed from ferrite material to insure rejection of high-frequency components of said transient overvoltages.

7. The invention set forth in claim 3 wherein said signalling leads are electrically connected to the windings of a balun coil.

8. The invention set forth in claim 1 further comprising means connected between said signalling lead and said ground lead for reducing high frequency components of any said developed voltages.

9. A circuit for connection between two communicating devices, said circuit comprising
an input having at least two signalling leads and a ground lead,
an output having at least two signalling leads and a ground lead,
a balun circuit having dual windings, each winding having an input side and an output side, said input side of each of said windings being connected to a different one of said input signalling leads, a plurality of serially connected inductors, each inductor having at least three windings and the windings of any of said inductors having one phase, one winding on each of said inductors being disposed in a path between said output side of one of said balun windings and one of said output signalling leads, another winding on each of said inductors being disposed in another path between said output side of the other one of said balun windings and the other one of said output signalling leads, and a third winding on each of said inductor being connected in yet another path between said input ground lead and said output ground lead.

10. The invention set forth in claim 9 wherein each of said inductors has a low permeability core relative to that of said balun circuit and each inductor has relatively few turns on each winding as compared to either balun circuit winding.

11. The invention set forth in claim 9 wherein said balun circuit includes a small core wound to yield a large inductance and wherein said inductors include at least one core larger than said balun core wound to yield relatively small inductance.

12. The invention set forth in claim 9 wherein said inductor windings are formed by looping said signalling leads and said ground lead around at least one inductive core.

13. the invention set forth in claim 9 wherein said inductor windings are formed by looping said signalling leads and said ground lead around a series of inductive cores.

14. The invention set forth in claim 9 wherein said balun circuit input leads are connected to a signal pulse-shaping circuit.

15. The invention set forth in claim 9 further comprising low pass filter means, and
means for connecting said loss pass filter means between said ground lead and each said signalling lead.

16. The invention set forth in claim 15 wherein said low pass filter means includes a pair of capacitors.

17. A linear surge protection circuit for insertion in a data communication line, said line having at least one signalling lead and one ground lead, said circuit comprising a plurality of inductor coils in said signalling lead and said ground lead having one phase, said coils having a permeability constant over a wide frequency range.

18. The invention set forth in claim 17 wherein said core is a ferrite ring.

19. The invention set forth in claim 17 wherein said circuit includes a series of said cores around each of which are positioned few turns of said data communication line.

20. the invention set forth in claim 17 wherein said circuit includes means connected to said data communication line for shaping signalling pulses on said transmission line.

21. The invention set forth in claim 17 wherein the number of said turns of said data communication line around said core is under twenty.

* * * * *